United States Patent [19]

Imoto et al.

[11] Patent Number: 5,254,797
[45] Date of Patent: Oct. 19, 1993

[54] METHOD OF TREATING EXHAUST GAS

[75] Inventors: Yoshinori Imoto, Nagoya; Katsunosuke Hara, Kariya; Masakatsu Hiraoka, 39-763, Kohata, Okurayama, Uji City, Kyoto-Fu; Kunio Sano; Akira Inoue, both of Himeji, all of Japan

[73] Assignees: NGK Insulators, Ltd.; Masakatsu Hiraoka; Nippon Shokubai Kagaku Kogyo Co., Ltd., all of Japan

[21] Appl. No.: 981,983

[22] Filed: Nov. 24, 1992

Related U.S. Application Data

[63] Continuation of Ser. No. 534,248, Jun. 7, 1990, abandoned.

[30] Foreign Application Priority Data

Jun. 7, 1989 [JP] Japan .................. 1-144667
Jun. 8, 1989 [JP] Japan .................. 1-146250

[51] Int. Cl.$^5$ .................. A62D 3/00; F23G 5/00; C01B 7/00
[52] U.S. Cl. .................. 588/207; 110/346; 423/240 S; 423/245.3; 588/206
[58] Field of Search ............ 423/502, 240, 245.3, 423/248, 481, 659, DIG. 20, 240 S; 502/248, 415; 588/206, 207, 209; 110/346

[56] References Cited

U.S. PATENT DOCUMENTS

| | | | |
|---|---|---|---|
| 3,870,455 | 3/1975 | Hindin | 502/304 |
| 3,910,851 | 10/1975 | Messing | 502/415 |
| 3,972,979 | 8/1976 | Kageyama | 423/481 |
| 3,989,806 | 11/1976 | Hyatt | 423/488 |
| 4,018,706 | 4/1977 | Inoue et al. | 502/248 |
| 4,289,737 | 9/1981 | Acres et al. | 423/245.3 |
| 4,335,023 | 6/1982 | Dettling et al. | 502/262 |
| 4,727,694 | 12/1987 | Wan et al. | 502/304 |
| 4,771,029 | 9/1988 | Pereira et al. | 502/335 |
| 4,916,109 | 4/1990 | Baiker et al. | 502/339 |
| 4,935,212 | 6/1990 | Jacob | 423/240 S |
| 4,957,717 | 9/1990 | Imamura et al. | 423/240 |
| 4,978,513 | 12/1990 | Baiker et al. | 423/245.3 |
| 5,106,395 | 4/1992 | Weber et al. | 55/1 |

FOREIGN PATENT DOCUMENTS

| | | |
|---|---|---|
| 0299485 | 1/1989 | European Pat. Off. . |
| 3804722 | 8/1989 | Fed. Rep. of Germany . |
| 129293 | 1/1978 | German Democratic Rep. . |
| 90/13352 | 11/1990 | PCT Int'l Appl. .......... 423/240 |
| 1002337 | 8/1965 | United Kingdom . |

OTHER PUBLICATIONS

Imamura, Seiichiro, Catalytic Decomposition of Halogenated Organic Compounds and Deactivation of Catalysts, Catalysis Today (11) 1992, pp. 547-567 Elsevier Science Publishing, Amsterdam.

Choudhry et al, Mechanisms in the Thermal Formation of Chlorinated Compounds Including Polychlorinated Dibenzo-p-Dioxins, Chlorinated Dioxins and Related Compounds, Pergamon Series on Environmental Studies vol. 5, pp. 275-301, Pergamon Press, New York.

Chatterjee et al, Deactivation of Metal Exchanged Zeolite Catalysts During Exposure to Chlorinated Hydrocarbons under Oxidizing Conditions, Catalysis Today (11) 1992, pp. 569-596 Elsevier Science Pub., Amsterdam ES&T—Environmental Science & Technology, vol. 22, No. 5, May 1988, pp. 557-561, Washington, D.C., US; P. Subbanna et al.: "Catalytic Oxidation of Polychlorinated Biphenyls in a Monolithic Reactor System".

*Primary Examiner*—Gary P. Straub
*Attorney, Agent, or Firm*—Parkhurst, Wendel & Rossi

[57] ABSTRACT

A catalyst composition including component A and component B, the component A being a carrier, preferably having a honeycomb structure, and being a single-component oxide or a multi-component composite oxide of at least one metal of titanium, silicon and zirconium, and the component B being a catalyst component deposited on the carrier of component A and being at least one member selected from the group of noble metals and other specifically limited metals and their oxides, is very effective for decomposing and removing poisonous organic chlorine compounds, such as dioxin and the like, or poisonous organic chlorine compound-forming substances contained in an exhaust gas exhausted from an incinerator of an incineration plant provided with the incinerator and a dust collector. In addition, and the generation of the poisonous organic chlorine compound from the incineration plant can be prevented.

16 Claims, 5 Drawing Sheets

FIG_4
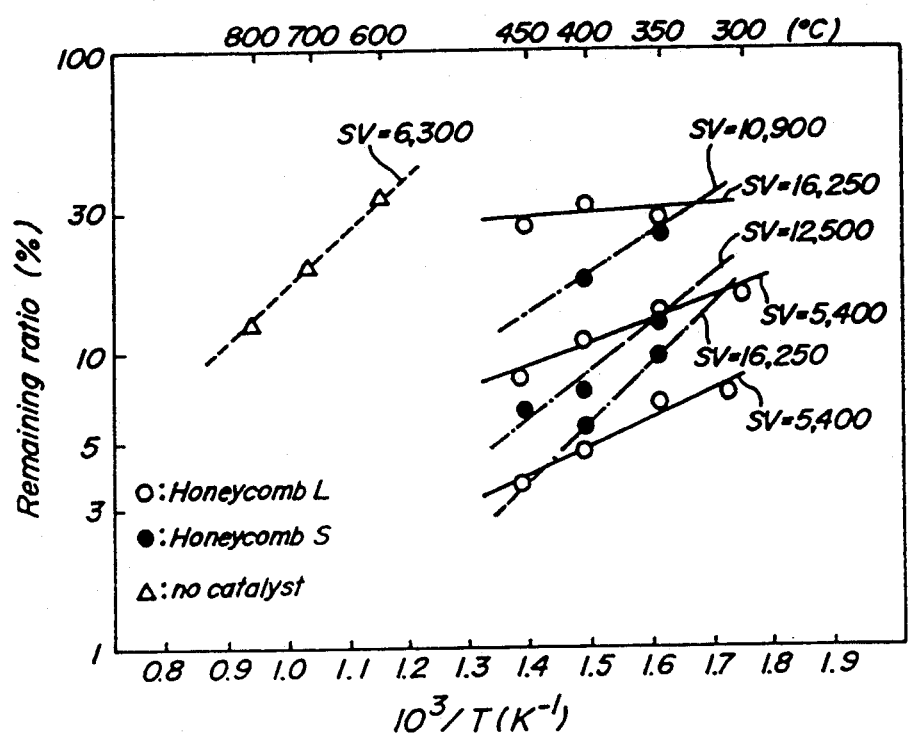
FIG_5
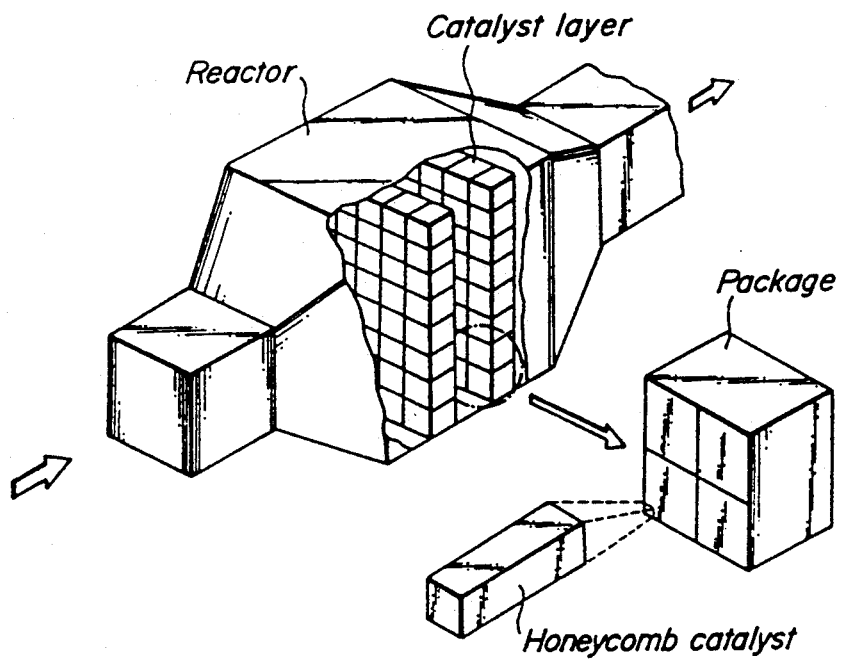

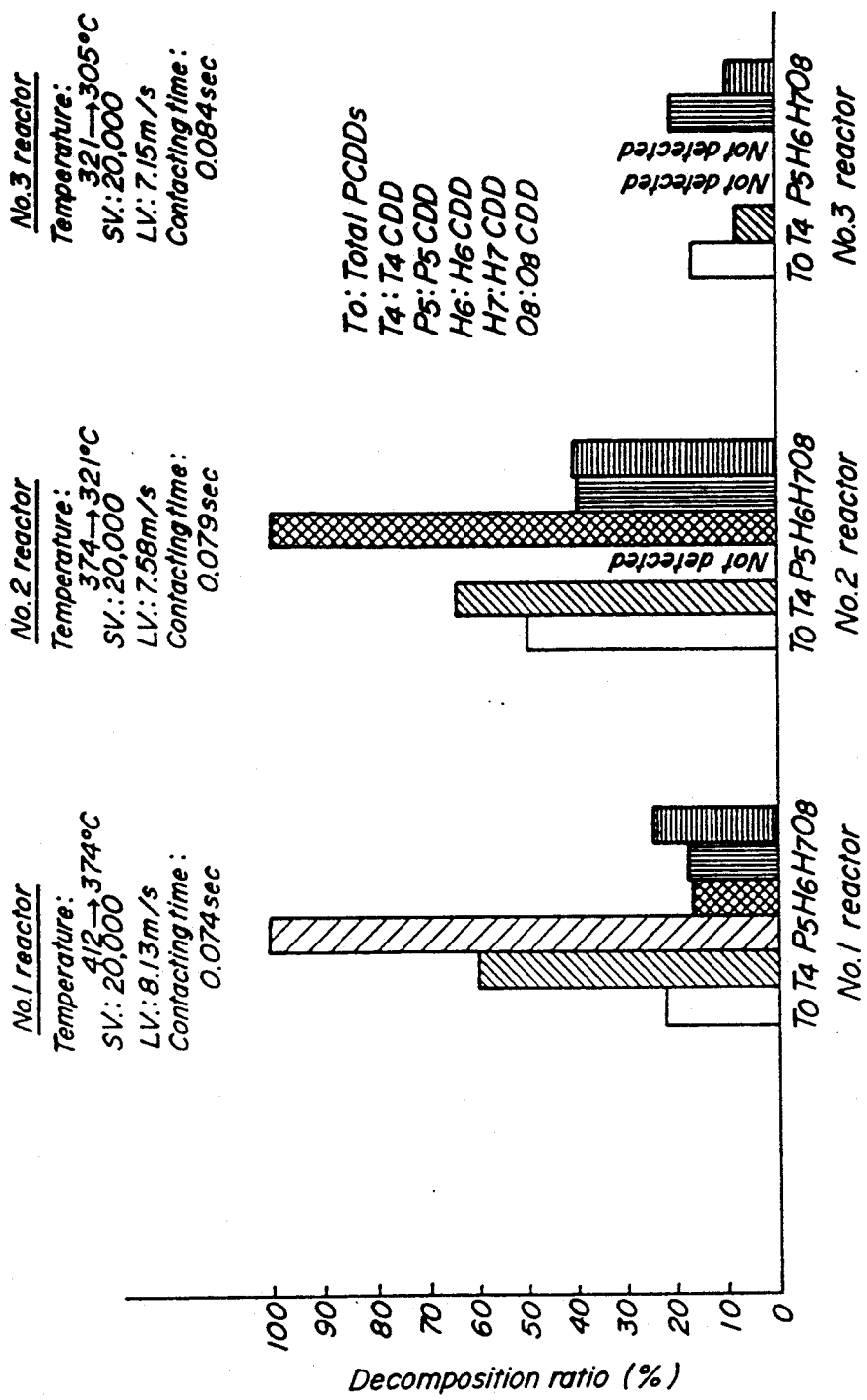

METHOD OF TREATING EXHAUST GAS

This is a continuation of application Ser. No. 07/534,248 filed Jun. 7, 1990, now abandoned.

BACKGROUND OF THE INVENTION

1. Field of the Invention

This invention relates to a method of treating exhaust gas, and more particularly relates to a method of treating exhaust gas, which is exhausted from an incinerator of an incineration plant provided with an incinerator and a dust collector and contains poisonous organic chlorine compounds, such as polychlorinated dibenzo-p-dioxin, polychlorinated dibenzofuran and the like, with a catalyst to decompose and remove the poisonous organic chlorine compounds in the treatment of a waste product containing a chlorine-containing polymer by the incineration plant.

2. Related Art Statement

Exhaust gas, which is generated from an incineration plant used for treating an industrial waste product or city waste product, contains poisonous substances such as $SO_x$, $NO_x$, HCl, cyanogen and the like, and the techniques for removing these poisonous substances have been investigated. These poisonous substances have been actually removed from the viewpoint of the protections of human body and environment. However, the investigation of the method for removing poisonous organic chloride compounds, such as dioxin, PCB, chlorophenol and the like, which are contained in exhaust gas in a very small amount, has recently been started, and a practically applicable method for removing the poisonous organic chlorine compounds has not yet been established. Among these poisonous organic chlorine compounds, a compound called dioxin is polychlorinated dibenzo-p-dioxin, which includes a dichloro-compound, tetrachloro-compound, pentachloro-compound, hexachloro-compound and the like corresponding to the number of chlorine atoms, and has a large number of isomers of more than 70. Particularly, tetrachlorodibenzo-p-dioxin (hereinafter, abbreviated as $T_4CDD$) is known as a substance having the strongest poisonous property. Moreover, dioxin is very stable, does not dissolve in water and has a poisonous property which does not disappear semipermanently. Therefore, dioxin has a very high influence upon the environment due to the strong and everlasting poisonous property.

The mechanism of the formation of dioxin in an incineration plant is believed to be that dioxin is formed as a by-product when a waste product containing a chlorine-containing polymer is heated and decomposed in an incinerator. However, the mechanism has not yet been fully clarified.

The object of the present invention is to provide a method of treating a waste product capable of preventing the generation of poisonous organic chlorine compounds, such as dioxin and the like, in the incineration treatment of various waste products.

SUMMARY OF THE INVENTION

The feature of the present invention lies in a method of treating an exhaust gas, wherein a waste product containing a chlorine-containing polymer is treated with an incineration plant provided with an incinerator and a dust collector, an improvement comprising treating with a catalyst an exhaust gas exhausted from the incinerator under a specifically limited condition to decompose and remove poisonous organic chlorine compounds, such as polychlorinated dibenzo-p-dioxin, polychlorinated dibenzofuran and the like, which are contained in the exhaust gas, the specifically limited condition being that the reaction temperature is not lower than 250° C., the space velocity (SV) of the exhaust gas is not higher than 50,000 $hr^{-1}$ and the amount of the exhaust gas per 1 $m^2$ of the surface area of the catalyst is not larger than 250 $m^3/hr$ (at the treating temperature).

BRIEF DESCRIPTION OF THE DRAWINGS

FIG. 4 is a graph illustrating relations between the variation of SV and the remaining ratio of PCDDs;

FIG. 5 is a perspective view illustrating the structure of a reactor;

FIG. 8 is a graph illustrating the variation of the decomposition ratio of each PCDD component of PCDDs decomposed in three reactors arranged in a series connection.

Figure 7:
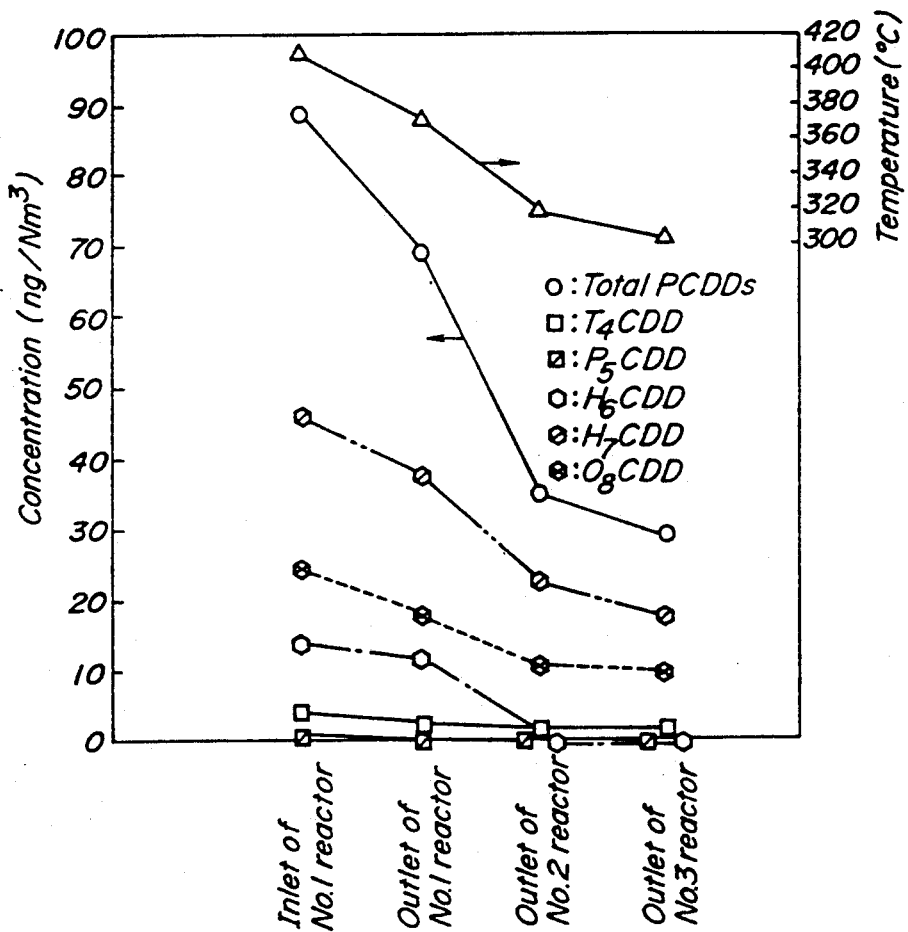
FIG. 7 is a graph illustrating the variation of concentration of each PCDD component of PCDDs in the case where three reactors, each having a catalyst-deposited shaped body received therein, are arranged in a series connection.

The abbreviation of PCDDs, $T_4CDD$, $P_5CDD$, $H_6CDD$, $H_7CDD$ and $O_8CDD$ in FIGS. 7 and 8 mean as follows. PCDDs means polychlorinated dibenzo-p-dioxins; $T_4CDD$ means tetrachloro-dibenzo-p-dioxin; $P_5CDD$; means pentachloro-dibenzo-p-dioxin; $H_6CDD$ means hexahloro-dibenzo-p-dioxin; $H_7CDD$ means heptachloro-dibenzo-p-dioxin; and $O_8CDD$ means octachloro-dibenzo-p-dioxin.

DESCRIPTION OF THE PREFERRED EMBODIMENT

The present invention relates to a method of removing poisonous organic chlorine compounds, such as polychlorinated dibenzo-p-dioxin, polychlorinated dibenzofuran and the like, which are contained in an exhaust gas exhausted from an incinerator used for treating an industrial waste product and city waste product, by treating the exhaust gas with a catalyst.

The reaction temperature is a very important factor, and it is necessary that the reaction temperature is kept to not lower than 250° C., preferably within the range of 250°–500° C. The use of the reaction temperature within this range can attain a treating effect superior to the effect attained by the so-called direct burning system treatment. When the reaction temperature is lower than 250° C., the removing efficiency is low, and further the catalyst is considerably poisoned by HCl and SOx contained in the exhaust gas, and hence the catalyst deteriorates acceleratedly. On the contrary, when the reaction temperature is excessively high, there is a risk that the catalyst changes its properties, and it is difficult to use the catalyst for a long period of time. Therefore, it is desired that the reaction temperature is kept to a temperature of not higher than 500° C.

Further, it is necessary that the amount of exhaust gas to be passed through the catalyst is not larger than 250 m$^3$/hr (at the treating temperature) per 1 m$^2$ of the surface area of catalyst. When the amount of exhaust gas per 1 m$^2$ of the surface area of catalyst exceeds 250 m$^3$/hr (at the treating temperature), the removing efficiency lowers, and the use of such small amount of catalyst is not suitable for the practical purpose.

It is necessary that the space velocity (SV) of the exhaust gas is not higher than 50,000 hr$^{-1}$. When the space velocity exceeds 50,000 hr$^{-1}$, the removing efficiency lowers. The lower limit of the space velocity is not particularly limited. However, when the space velocity is less than 2,000 hr$^{-1}$, a large amount of catalyst must be used, and the use of such large amount of catalyst is expensive.

The pressure is not particularly limited, but a pressure within the range of 0.01–10 kg/cm$^2$ is preferable.

In the present invention, the position, at which the above described decomposition and removal of poisonous organic chlorine compounds, for example, dioxin, dioxin-forming substances and the like, are carried out with the use of a catalyst, is not particularly limited, but it is preferable to decompose and remove the poisonous organic chlorine compounds at a stage before the chlorine compounds are introduced into a dust collector. The reason is as follows. The inventors have investigated the generation state of a poisonous organic chlorine compound (hereinafter, an explanation will be made by the use of dioxin as a typical compound of poisonous organic chlorine compounds) in an incineration plant in order to prevent the discharge of dioxin from the incineration plant. As a result, it has been determined that dioxin is not formed in the incinerator alone, but rather is formed in a large amount in a dust collector (an electric dust collector is generally used) arranged together with the incinerator in the incineration plant. That is, an incineration plant comprises generally an incinerator, a cooling duct, a dust collector and the like, and it was found that, among the concentrations of dioxin in the exhaust gases in the inlet and outlet of each part, the dioxin had the highest concentration at the outlet of the dust collector, and dioxin was not contained in a large amount in the exhaust gas at the outlet of the incinerator. The reason is probably that the high temperature condition in the incinerator is not a suitable condition for the dioxin-forming reaction, and an exhaust gas exhausted from the incinerator is cooled in the cooling duct into a temperature (about 300° C.), at which temperature a dioxin-forming reaction proceeds easily, and the thus cooled exhaust gas is introduced into the dust collector for removing the dust component, and the dioxin-forming reaction is proceeded at a stretch in this dust collector.

Therefore, the exhaust gas is subjected to the above described decomposition and removing treatment with a catalyst at the stage just after the exhaust gas is exhausted from the incinerator, whereby not only dioxin itself, but also dioxin-forming substances are decomposed and removed, as clearly understood from the above described acknowledgement. That is, when a dioxin-forming substance which contains the thermal decomposition product of a chlorine-containing polymer, is passed through the catalyst, the dioxin-forming substance is decomposed into $CO_2$, $H_2O$, $Cl_2$, HCl and the like, and even when these decomposition products are introduced into a dust collector, dioxin is no longer formed. Moreover, even when a small amount of dioxin is contained in a waste product or a very small amount of dioxin is formed in an incinerator, the dioxin can be decomposed by passing through the catalyst the exhaust gas exhausted from the incinerator.

As the method for decomposing and removing the dioxin-forming substance, there are known a so-called direct burning-type treating method, wherein a high temperature burning is carried out; an adsorption method by the use of activated carbon and the like; a washing method by the use of chemicals; and the like.

Among these methods, the direct burning-type treating method is a method, wherein the above described poisonous organic chlorine compound is completely oxidized and decomposed during the burning process, and it is necessary in the direct burning-type treating method that a high temperature of not lower than 1,000° C. is maintained in the practical operation. However, the burning temperature in the incinerator is 800°–900° C., and hence it is necessary that the temperature in the interior of the incinerator is further raised or a reburning portion is arranged in order to oxidize and decompose the poisonous organic chlorine compound. However, in the case where the temperature in the interior of the incinerator is raised, the incinerator must be wholly reconstructed, and moreover the ash of the incinerated substance is melted at a temperature higher than 900° C. to damage the incinerator wall. While, in the stoker incinerator which is predominantly used as a city-refuse incinerator, a local low-temperature portion is apt to be formed in the stoker incinerator, and it is an effective method to arrange a re-burning portion therein. However, this method has such drawbacks that the total amount of exhaust gas is increased and the running cost due to the fuel used for the re-burning is greatly increased. Moreover, the concentration of a substance, which is contained in the exhaust gas and is to be treated, is lowered, and the treating efficiency is necessarily lowered. While, in the adsorption method, it is necessary to carry out a reclaiming treatment of waste activated carbon. In the washing method, it is necessary to carry out a secondary treatment of waste liquid. Furthermore, these secondary treatments are very troublesome, and hence the adsorption method and washing method are not practical as methods for decomposing and removing the dioxin-forming substance contained in the exhaust gas.

The catalyst to be used in the present invention is not particularly limited, but in the present invention, there can be particularly effectively used an oxidizing catalyst consisting of a catalyst composition comprising component A and component B, the component A being at least one member selected from the group consisting of a single-component oxide and a multi-component composite oxide of at least one metal selected from the group consisting of Ti, Si and Zr, and the component B being at least one member selected from the group consisting of metals of Pt, Pd, Ru, Mn, Cu, Cr and Fe, and oxides of these metals. These catalysts are particularly preferable as a catalyst; and which can decompose and remove poisonous organic chlorine compounds, such as the above described dioxin-forming substance, dioxin and the like, in a high efficiency for a long period of time under an environment containing $NO_x$, $SO_x$, HCl, halogen gas, CO and the like. As an oxidizing catalyst consisting of the above described component A and component B there can be more preferably used a catalyst consisting of a binary composite oxide of $TiO_2$—$SiO_2$ or $TiO_2$—$ZrO_2$ or a ternary composite oxide of $TiO_2$—$SiO_2$—$ZrO_2$ used as a substrate, and at least one member selected from the group consisting of metals of Pt, Pd, Ru, Mn, Cu, Cr and Fe, and oxides of these metals, which metal and oxide is deposited on the substrate.

The $TiO_2$—$SiO_2$ or $TiO_2$—$SiO_2$—$ZrO_2$ gives preferable physical properties to the resulting completed catalyst due to its particular physical properties and at the same time serves as a carrier in the completed catalyst.

The $TiO_2$—$SiO_2$ to be used in the present invention is a so-called solid acid, which exhibits a remarkable acidic property not observed in the individual oxide constituting the binary composite oxide, as publicly known from Kozo Tabe, J. Catal., Vol. 35, 225-231 (1974), and further has a large surface area. That is, $TiO_2$—$SiO_2$ is not merely a combination of titanium oxide and silicon oxide, but can exhibit its particular physical properties due to the reason that titanium and silicon have been formed into a so-called binary composite oxide. $TiO_2$—$ZrO_2$ or $TiO_2$—$SiO_2$—$ZrO_2$ exhibits preferable physical properties due to the reason that titanium, silicon and zirconium have been formed into the binary or ternary composite oxide similar to the case of $TiO_2$—$SiO_2$.

The use of $TiO_2$—$SiO_2$ or $TiO_2$—$SiO_2$—$ZrO_2$ further has such a merit that the catalyst itself is acidic and has a remarkably high acid resistance, and exhibits a stable decomposition and removing performance for a long period of time without being influenced by the sulfur compound, halogen compound and the like contained in the gas to be treated. Moreover, in the catalyst of the present invention, $TiO_2$—$SiO_2$ or $TiO_2$—$SiO_2$—$ZrO_2$ is used, and hence the catalyst of the present invention is very low in the ability for oxidizing $SO_2$, which is contained in the gas to be treated, into $SO_3$ in spite of the fact that a noble metal is used as a catalyst component, and exhibits a peculiar property, which oxidizes selectively poisonous organic chlorine compounds, such as a dioxin-forming substance, dioxin and the like. Such low ability for oxidizing $SO_2$ is commercially remarkably advantageous in the points that heat-exchange can be effected inexpensively and the corrosion of materials can be prevented, as described above. The catalyst of the present invention has further such a merit that, due to the use of $TiO_2$—$SiO_2$ or $TiO_2$—$SiO_2$—$ZrO_2$ having a large surface area, the catalyst exhibits high activity even at a low temperature as illustrated in the Examples explained later in this specification, and exhibits a high decomposition and removing performance even at a high space velocity. The catalyst of the present invention has further such a merit that the catalyst can be easily produced. Therefore, the catalyst of the present invention can be formed into optional shapes, such as a pellet shape, plate shape, cylindrical shape, lattice shape, honeycomb shape and the like. Moreover, the catalyst of the present invention has excellent mechanical properties and physical properties, for example, has high crushing strength, high abrasion resistance, high dropping strength and the like, and can be stably used for a long period of time.

The catalyst of the present invention, which has excellent physical properties as described above, further exhibits excellent properties in the treatment of an exhaust gas containing a large amount of dust. That is, the moving bed type reaction is generally used due to the reason that exhaust gas contains a large amount of dust. Therefore, the catalyst to be used in the moving bed type reaction is demanded to have the above described very excellent various physical properties, particularly high durability. The catalyst of the present invention has a satisfactory high durability.

In the present invention, in addition to the multi-component composite oxide, $TiO_2$, $SiO_2$ or $ZrO_2$ single-component oxides can be used. However, the $TiO_2$—$SiO_2$ binary composite oxide or $TiO_2$—$SiO_2$—$ZrO_2$ ternary composite oxide is remarkably superior to a mixed oxides, which is obtained by merely mixing the single-component oxide of each metal, in the activity, the acid resistance, the durability of catalytic activity of the resulting completed catalyst, and in the mechanical properties relating to the production of the catalyst, and the like. The $TiO_2$—$SiO_2$ binary composite oxide and $TiO_2$—$SiO_2$—$ZrO_2$ ternary composite oxide of the present invention exhibit particularly excellent properties. Accordingly, the above described catalyst of the present invention, which can satisfy the above described various demands, is a very advantageous catalyst in industry.

The decomposition and removing catalyst containing the catalytically active substance consisting of the above described component A and component B is preferable as a catalyst to be used in the present invention, and it is a characteristic property for the catalyst to have further a large specific surface area in order that the catalyst exhibits its activity very effectively. A preferable specific surface area is 10-450 $m^2/g$. It is preferable that $TiO_2$—$SiO_2$, $TiO_2$—$SiO_2$—$ZrO_2$ or the like to be used in the present invention has a specific surface area of at least 10 $m^2/g$, and it is particularly preferable that $TiO_2$—$SiO_2$ or $TiO_2$—$SiO_2$—$ZrO_2$ consists, calculated as an oxide, of 5-95 mol% of $TiO_2$ and 95-5 mol% of $SiO_2$ alone or of the total amount of $SiO_2$ and $ZrO_2$ (based on 100 mol% of the total amount of $TiO_2$ and $SiO_2$ or the total amount of $TiO_2$, $SiO_2$ and $ZrO_2$, respectively). In $TiO_2$—$ZrO_2$ also, it is preferable that $TiO_2$—$ZrO_2$ has a specific surface area of at least 10 $m^2/g$, and it is particularly preferable that $TiO_2$13 $ZrO_2$ consists, calculated as an oxide, of 5-95 mol% of $TiO_2$ and 95-5 mol% of $ZrO_2$ (based on 100 mol% of the total amount of $TiO_2$ and $ZrO_2$).

Although $TiO_2$—$SiO_2$, $TiO_2$—$ZrO_2$ or $TiO_2$—$SiO_2$—$ZrO_2$ having a composition outside the above described range can be used in the present invention, they are somewhat poor in the mechanical strength of the resulting catalyst, and are not preferable.

The $TiO_2$—$SiO_2$ composite oxide and the like to be used as a carrier in the present invention can be produced from the following Ti and Si sources. The Ti source can be selected from inorganic titanium compounds, such as titanium chloride, titanium sulfate and the like; organic titanium compounds, such as titanium oxalate, tetraisopropyl titanate and the like; and the like. The Si source can be selected from inorganic silicon compounds, such as colloidal silica, water glass, silicon tetrachloride, silica gel and the like; organic silicon compounds, such as tetraethyl silicate and the like; and the like. These raw materials sometimes contain a very small amount of impurities and inclusions, but these impurities and inclusions may be contained in the raw material insofar as they have not a high influence upon the properties of the resulting $TiO_2$—$SiO_2$.

As the method for producing $TiO_2$—$SiO_2$, the following methods are preferable.

(1) A method, wherein titanium tetrachloride is impregnated with silica gel, and the impregnated titanium tetrachloride is heat treated at a temperature of 150°-650° C. to decompose the impregnated titanium tetrachloride and to form $TiO_2$—$SiO_2$.

(2) A method, wherein titanium tetrachloride is mixed with silica gel, and ammonia is added to the mixture to form a precipitate, and the resulting precipitate is washed, dried, and then calcined at a temperature of 150°-650° C.

(3) An aqueous solution of sodium silicate is added to titanium tetrachloride to react titanium tetrachloride with sodium silicate and to form a precipitate, and the resulting precipitate is washed, dried and then calcined at a temperature of 150°-650° C.

(4) To a water-alcohol solution of titanium tetrachloride is added tetraethyl silicate [$(C_2H_5O)_4Si$] to cause a hydrolysis reaction of titanium tetrachloride and tetraethyl silicate and to form a precipitate, and the resulting precipitate is washed, dried, and then calcined at a temperature of 150°-650° C.

(5) Ammonia is added to a water-alcohol solution of titanium oxychloride ($TiOCl_2$) and tetraethyl silicate to form a precipitate, and the resulting precipitate is washed, dried, and then calcined at a temperature of 150°-650° C.

Among the above described methods, the method of the item (2) is particularly preferable. The method (2) is concretely carried out as follows. That is, the above described compounds of Ti source and Si source are mixed with each other in a given molar ratio calculated as $TiO_2$ and $SiO_2$, and the resulting mixture is added to water so as to form an acidic aqueous solution or sol containing each of titanium and silicon in a concentration of 0.01-1.0 g, calculated as titanium oxide or silicon oxide, per 1 l of the solution or sol. The acidic aqueous solution or sol is kept at a temperature of 10°-100° C. Then, ammonia water used as a neutralizer is dropwise added to the aqueous solution or sol under stirring, and the stirring is continued for 10-180 minutes at a pH of 2-10 to form a coprecipitation compound consisting of a titanium compound and silicon compound. The coprecipitation compound is filtered, and the resulting residue is fully washed, and dried at a temperature of 80°-140° C. for 1-10 hours, and then calcined at a temperature of 150°-650° C. for 1-10 hours to obtain $TiO_2$—$SiO_2$. As another method, there can be used a method, wherein a given amount of the above described compound of silicon source is mixed with a sufficiently large amount of ammonia water used as a neutralizer, and to the resulting mixture is dropwise added a given amount of the above described compound of titanium source to form a coprecipitation compound, and the resulting coprecipitation compound is treated in the same manner as described above to form $TiO_2$—$SiO_2$.

The $TiO_2$—$ZrO_2$ or $TiO_2$—$SiO_2$—$ZrO_2$ can be produced in the same manner as the production of $TiO_2$—$SiO_2$. The Zr source can be selected from inorganic and organic Zr compounds.

That is, a Zr compound is handled together with the above described Ti compound alone or in combination with a Si compound in the same manner as described in the production of $TiO_2$—$SiO_2$ or $TiO_2$—$SiO_2$—$ZrO_2$, whereby $TiO_2$—$ZrO_2$ or $TiO_2$—$SiO_2$—$ZrO_2$ can be easily produced. It is preferable that the amount of Zr contained in the $TiO_2$—$SiO_2$—$ZrO_2$ lies within the range up to 30% by weight, calculated as $ZrO_2$, based on the total amount of $TiO_2+SiO_2+ZrO_2$.

A completed catalyst can be obtained according to the production method of catalyst, which will be explained hereinafter, by the use of, for example, the $TiO_2$—$SiO_2$ or $TiO_2$—$SiO_2$—$ZrO_2$ produced according to the above described method. That is, the resulting $TiO_2$—$SiO_2$ or $TiO_2$—$SiO_2$—$ZrO_2$ is mixed with a proper molding assistant, and the resulting mixture is fully kneaded together with a proper amount of water to form a homogeneous mixture, and the resulting homogeneous mixture is extruded into a cylindrical shaped body through an extruder, and the resulting shaped body is dried and calcined to obtain a shaped article of $TiO_2$—$SiO_2$ or $TiO_2$—$SiO_2$—$ZrO_2$.

As the molding assistant, there can be used commonly known organic substances, such as crystalline cellulose, methyl cellulose, polyethylene glycol, polyvinyl alcohol, polyacrylamide, polyvinyl acetate, starch and the like, which are decomposed and oxidized by the firing and are flown away. Further, in order to carry out more easily the molding, acid may be used. The acids include mineral acids, such as sulfuric acid, nitric acid and the like, and organic acids, such as formic acid, acetic acid, oxalic acid and the like. Further, glass fiber, glass powder and the like can be used in order to increase the strength of the resulting catalyst. Moreover, $TiO_2$—$SiO_2$ or $TiO_2$—$SiO_2$—$ZrO_2$ can be used in admixture with a powder, which is ordinarily used as a carrier. The powder includes, for example, powders of alumina, silica, silica.alumina, bentonite, diatomaceous earth, titania, zirconia, titanium phosphate, magnesia, barium oxide, zinc oxide, tin oxide and the like.

As to the shape of the shaped article, there can be selected an optional shape, for example, pellet shape, plate shape, honeycomb shape, doughnut shape, ribbon shape, corrugated sheet shape and the like. In general, the shaped article having such optional shape can be obtained by the extrusion molding by means of an extruder. Alternatively, a slurry of $TiO_2$—$SiO_2$ or $TiO_2$—$SiO_2$—$ZrO_2$ is blown to the above described ordinary carrier, and the thus treated carrier can be handled in the same manner as in the case of the above described shaped article. The resulting green shaped article is dried at a temperature of 10°-140° C. for 1-48 hours, and then calcined. The calcining is generally carried out at a temperature of not higher than 1,000° C., preferably at a temperature of 200°-900° C., for 1-10 hours under an air atmosphere or under an air flow atmosphere.

Another catalyst component B, that is, a noble metal catalyst substance of Pt, Pd, Ru or the like, or a metal of Mn, Cu, Cr, Fe or the like or its oxide, is supported on the above obtained shaped article of $TiO_2$—$SiO_2$ or $TiO_2$—$SiO_2$—$ZrO_2$, which has a pellet-like shape or other shape, to obtain a completed catalyst. As the catalyst component B, metals of the Group VII in the Periodic Table are preferably used. Among them, Pt, Pd and Ru are particularly preferable. As the starting material of catalyst component B, chloride, nitrate, organic acid salt, chloro-noble metal acid, copper compound and the like are preferable. The catalyst component B is supported on a shaped article of $TiO_2$—$SiO_2$ or $TiO_2$—$SiO_2$—$ZrO_2$ in an amount of 0.05-20 g, preferably 0.1-5 g, and more preferably 0.3-3 g, calculated as metal, per 1 l of the shaped article of $TiO_2$—$SiO_2$ or $TiO_2$—$SiO_2$—$ZrO_2$.

In the production of the catalyst of the present invention, the use of a polyoxyethylene-type nonionic surfactant at the supporting of the catalyst component on the carrier is very advantageous. When a polyoxyethylene-type nonionic surfactant is used, a proper amount of bubbles are formed to smooth the mutual contact between the aqueous solution of catalyst component and the carrier particle and the wall of a vessel for producing a catalyst, whereby the catalyst component can be uniformly supported on the carrier in a high reproducibility. When a catalyst component B is supported on the carrier, the catalyst component B is effectively dispersed and supported on the catalyst surface and the surface layer of catalyst due to the low permeability of the surfactant, whereby a catalyst having a desired level can be obtained by the minimum supported amount. Particularly, when a large amount of catalysts are produced, these merits are effectively developed.

The surfactants to be used in the present invention are as follows.

Polyethylene glycol HO(CH$_2$CH$_2$O)$_n$H
(wherein n is a positive integer of 11–900)

Polyoxyethylene glycol alkyl ether RO(CH$_2$CH$_2$O)$_n$H
(wherein R represents an alkyl group having 6–30 carbon atoms, and n is a positive integer of 3–120)

Polyoxyethylene-polyoxypropylene-polyoxyethylene glycol
HO(CH$_2$CH$_2$O)$_a$-(CH$_2$CH$_2$CH$_2$O)$_b$-(CH$_2$CH$_2$O)$_c$H
(wherein a, b, c are positive integers of at least 1, and the sum of a + b + c is 20–400)

Tetronic-type nitrogen-containing nonionic surfactant represented by the general formula of H(C$_2$H$_4$O)$_{y2}$(C$_3$H$_6$O)$_{x2}$\        /H(C$_2$H$_4$O)$_{y1}$(C$_3$H$_6$O)$_{x1}$
                                N
                                |
                                C$_2$H$_4$
                                |
                                N
(C$_3$H$_6$O)$_{x4}$(C$_2$H$_4$O)$_{y4}$H /   \(C$_3$H$_6$O)$_{x3}$(C$_2$H$_4$O)$_{y3}$H (wherein x$_1$–x$_4$ and y$_1$–y$_4$ are positive integers of at least 1,
and the sum of x$_1$ + x$_2$ + x$_3$ + x$_4$ + y$_1$ + y$_2$ + y$_3$ + y$_4$ is 20–500)

Polyoxyethylene alkylaryl ether R$^1$—⟨C$_6$H$_4$⟩—O(C$_2$H$_4$O)$_n$H (wherein R$^1$ represents an alkyl group having 6–12 carbon atoms, and n is a positive integer of 3–120)

Polyoxyethylene alkyl ester R—COO(C$_2$H$_4$O)$_n$H or
R—COO(C$_2$H$_4$O)$_n$—CH$_2$CH$_2$COO—R
(wherein R represents an alkyl group having 6–24 carbon atoms, and n is a positive integer of 3–120)

Polyoxyethylene alkylamine represented by the general formula of

R—NH(C$_2$H$_4$O)$_n$H or R—N$\big\langle$ (C$_2$H$_4$O)$_{n1}$H / (C$_2$H$_4$O)$_{n2}$H (wherein R represents an alkyl group having 6–30 carbon atoms, and n, n$_1$ and n$_2$ are positive integers of 3–120)

Polyoxyethylene alkylamide represented by the general formula of

R—CONH(C$_2$H$_4$O)$_n$H or R—CON$\big\langle$ (C$_2$H$_4$O)$_{n1}$H / (C$_2$H$_4$O)$_{n2}$H (wherein R represents an alkyl group having 6–30 carbon atoms, and n, n$_1$ and n$_2$ are positive integers of 3–120)

Fatty acid ester of polyoxyethylene sorbitan represented by the general formula of

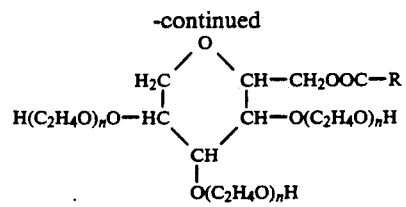

(wherein R represents an alkyl group having 6–24 carbon atoms, and n is a positive integer of 3–60)

Among these polyoxyethylene-type nonionic surfactants, ones having an average molecular weight of not less than 500, particularly not less than 1,000, are preferably used. The nonionic surfactants having an average molecular weight of less than 500 has a high permeability, and a catalyst component (particularly noble metal component) is uniformly distributed and supported on a carrier up to the interior of the carrier, and hence an excessively large amount of the catalyst component is obliged to be used. This surfactant is used in an amount of 0.1–50 g, preferably 0.2–20 g, per 1 l of the carrier. When the surfactant is added to an aqueous solution of catalyst component, the surfactant is used in an amount that the resulting aqueous solution contains 0.01–10% by weight, preferably 0.02–5% by weight of the surfactant.

The carrier having a platinum compound, palladium compound or rhodium compound deposited thereon is dried at a temperature of 30°–200° C., preferably 70°–170° C., and then subjected to a calcining in air at a temperature of 300°–700° C., preferably 400°–600° C., or to a reduction treatment in hydrogen gas or in a hydrogen-nitrogen mixed gas at a temperature of 150°–600° C., preferably 250°–500° C., whereby a completed catalyst is obtained. Further, when the above described carrier having a platinum compound, palladium compound or rhodium compound deposited therein is activated, in place of the above described air heating treatment or hydrogen gas or hydrogen-nitrogen mixed gas treatment, by a treatment with an exhaust gas to be treated, a completed catalyst can be obtained as well.

The type of the reactor is not particularly limited, but an ordinary fixed bed type reactor, moving bed type reactor, fluidized bed type reactor and the like can be used.

Exhaust gas contains a large amount of dust, and there is a risk of causing a clogging. Therefore, there is particularly preferably used a honeycomb shape as a shape of catalyst, because a honeycomb shape can easily control the hole-opening dimension corresponding to the amount of duct.

That is, in the case where a large amount of dust is contained in an exhaust gas, even when the shape of catalyst is a granular shape or honeycomb shape, if the through-hole has a small cross-sectional area, the pressure loss is large, and hence the height of the packed layer is limited in the practical use of the catalyst.

Moreover, even when the shape of a catalyst is a granular shape or honeycomb shape, if the through-hole has a small cross-sectional area, the through-hole is apt to be clogged due to the accumulation or fusion of dust contained in the exhaust gas.

On the contrary, the honeycomb shaped catalyst is smaller in the pressure loss than the granular catalyst, and further in the honeycomb shaped catalyst, when the dimension of the cross-section of through-hole and the aperture ratio are properly selected, the clogging of the through-hole due to the accumulation and fusion of dust in the exhaust gas can be prevented.

That is, in the present invention, the equivalent diameter (equivalent diameter=(cross-sectional area of through-hole×4)/inner peripheral length of through-hole) of a through-hole of a honeycomb structural body and the aperture ratio thereof are limited, whereby the pressure loss is decreased, the clogging of the through-hole by dust is prevented, and poisonous organic chlorine compounds, such as dioxin and the like, are decomposed and removed. In this case, a honeycomb catalyst consisting of a honeycomb structural body having an equivalent diameter of a through-hole of at least 2 mm and an aperture ratio of at least 50% exhibits an excellent removing performance for a long period of time in the treatment of an exhaust gas containing a large amount of dust, for example an exhaust gas exhausted from an incinerator.

When the equivalent of a through-hole is less than 2 mm, the through-hole is easily clogged by dust, and the honeycomb catalyst can not be practically used. The upper limit of the equivalent diameter is not particularly limited. However, a honeycomb catalyst having an equivalent diameter of a through-hole of as large as 50 mm can not satisfy the condition that the amount of gas per 1 $m^2$ of the surface area of the catalyst is not larger than 250 $m^3$/hr (at the treating temperature), and hence the catalyst is very poor in the removing performance. When a honeycomb catalyst has an aperture ratio of less than 50%, the pressure loss in the catalyst is large, and the through-hole is easily clogged by the dust and the catalyst can not develop the merit of a honeycomb catalyst. The upper limit of the aperture ratio is not particularly limited. However, when it is intended to produce a honeycomb structural body having an aperture ratio higher than 90%, it is necessary that the wall thickness of the honeycomb structural body is made into a small thickness, and hence there is a certain limitation in the upper limit of the aperture ratio in view of the strength of the honeycomb structural body.

The following examples are given for the purpose of illustration of this invention and are not intended as limitations thereof.

In the examples, the analysis of PCDDs is carried out as follows.

(1) Sampling method of exhaust gas sample 500 l of an exhaust gas sample was sampled at a flow rate of 5 l/min by a method, wherein a sampling tube is inserted into a sampling portion, and dust is collected by means of a cylindrical filter paper, and then the thus treated exhaust gas is introduced into an impinger set (consisting of two impingers, each containing 100 ml of water, one impinger containing 100 ml of diethylene glycol together with 100 ml of glass beads, and one vacant impinger) cooled by ice water and then into an adsorbent layer (Amberlite XAD-2).

(2) Extraction

The drain, diethylene glycol solution, methanol washing liquid and benzene washing liquid are mixed and the resulting mixture is subjected to a benzene extraction.

The cylindrical filter paper is immersed in 2N-HCl solution (100 ml), and the 2N-HCl solution is heated together with the cylindrical fiber paper in a boiling water bath for 1 hour, and the resulting 2N-HCl solution was subjected to a benzene extraction. The residue is dried in air, mixed with benzene and then subjected to a Soxhlet extraction for 24 hours.

The XAD-2 resin is subjected to 2 times of Soxhlet extractions with the use of acetone, each for 30 minutes, and further to 2 times of Soxhlet extractions with the use of benzene, each for 30 minutes. The extracted acetone layer and benzene layer are gathered and mixed with water, and then the benzene layer is separated. The water layer is subjected to a benzene extraction.

All the extracted benzene layers are gathered, and an internal standard substance is added to the benzene solution. The thus treated benzene solution is subjected to an alkali washing (0.1N-NaOH) and to an acid treatment (conc. $H_2SO_4$), and then washed with water, dehydrated and then concentrated. The concentrated mass is added with n-hexane to make up to 5 ml. The resulting n-hexane solution is used in the following column clean-up.

(3) Column clean-up

The sample obtained in the above described item (2) is fractionated by means of an alumina column in the following manner. That is, the sample is treated with 120 ml of n-hexane to remove impurities contained therein, and then fractionated into PCDDs fraction and PCDF (abbreviation of polychlorinated dibenzofuran) fraction through the aluminum column by the use of 70 ml of a mixture of n-hexane and dichloromethane (1:1). The effluents are concentrated, and the resulting concentrates are cleaned up by means of an HPLC (high speed liquid chromatography).

(4) HPLC

The PCDDs fraction obtained by the column chromatography is concentrated, the concentrated PCDD fraction is dissolved in chloroform, and the PCDD chloroform solution is poured into a reverse phase system column to obtain fractions ranging from $T_4CDD$ fraction to $O_8CDD$ (abbreviation of octachloro-dibenzodioxane) fraction. The effluents are extracted with n-hexane, and the n-hexane solution is concentrated. When it is necessary to further clean up the above obtained fractions, fractions ranging from $T_4CDD$ fraction to $O_8CDD$ fraction are obtained by means of an HPLC using a normal phase system column. The effluents are concentrated, and then subjected to a GC/MS analysis.

The above obtained PCDFs fraction is also subjected to the same treatment as the treatment of PCDDs fraction.

EXAMPLE 1

Figure 2:
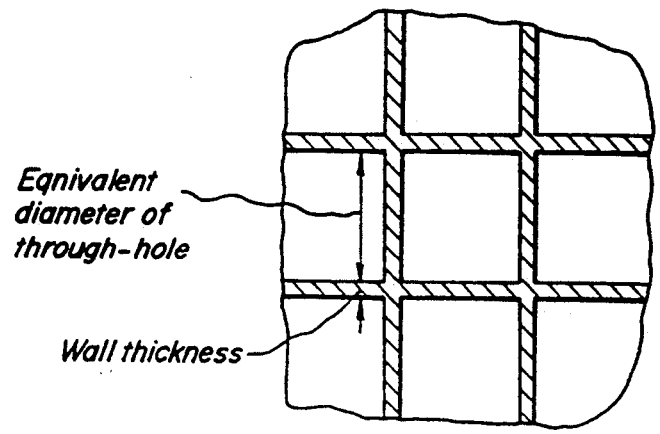
FIG. 2 is an explanative view of the structure of a honeycomb shaped article.

A decomposition test of a gas containing PCDDs wa effected under the condition shown in the following Table 1 by the use of a completed catalyst produced by depositing 1.5 g of Pt (per 1l of catalyst) on a honeycomb shaped article (refer to FIG. 2) consisting of a composite oxide of Ti and Si in a molar ratio of $TiO_2:SiO_2=8.5:1.5$. The obtained results are shown in the following Table 1.

TABLE 1(a)

| Experiment No. | Temperature (°C.) | SV | AV* | Decomposition ratio (%) | Evaluation | Oxygen concentration in gas (%) | Concentration of PCDDs at the inlet (ng/Nm³) | Honeycomb shaped article Equivalent diameter of through-hole (mm) | Wall thickness (mm) |
|---|---|---|---|---|---|---|---|---|---|
| 1-1  | 200 | 3,000  | 11  | 38.3 | x | 5~7 | 300~400 | 6 | 1 |
| 1-2  | 300 | 3,000  | 13  | 98.3 | o | " | " | " | " |
| 1-3  | 450 | 3,000  | 16  | 99.2 | o | " | " | " | " |
| 1-4  | 200 | 10,000 | 35  | 27.4 | x | " | " | " | " |
| 1-5  | 300 | 10,000 | 43  | 94.0 | o | " | " | " | " |
| 1-6  | 450 | 10,000 | 54  | 95.1 | o | " | " | " | " |
| 1-7  | 200 | 45,000 | 159 | 22.1 | x | " | " | " | " |
| 1-8  | 300 | 45,000 | 193 | 84.0 | o | " | " | " | " |
| 1-9  | 450 | 45,000 | 243 | 84.2 | o | " | " | " | " |
| 1-10 | 200 | 60,000 | 212 | 19.6 | x | " | " | " | " |
| 1-11 | 300 | 60,000 | 257 | 50.0 | x | " | " | " | " |
| 1-12 | 450 | 60,000 | 324 | 27.5 | x | " | " | " | " |
| 1-13 | 300 | 3,000  | 22  | 98.0 | o | " | " | 10 | 2 |
| 1-14 | 450 | 3,000  | 28  | 99.0 | o | " | " | " | " |

TABLE 1(b)

| Experiment No. | Temperature (°C.) | SV | AV* | Decomposition ratio (%) | Evaluation | Oxygen concentration in gas (%) | Concentration of PCDDs at the inlet (ng/Nm³) | Honeycomb shaped article Equivalent diameter of through-hole (mm) | Wall thickness (mm) |
|---|---|---|---|---|---|---|---|---|---|
| 1-15 | 300 | 10,000 | 73  | 92.6 | o | 5~7 | 300~400 | 10 | 2 |
| 1-16 | 450 | 10,000 | 93  | 93.2 | o | " | " | " | " |
| 1-17 | 300 | 45,000 | 337 | 49.8 | x | " | " | " | " |
| 1-18 | 450 | 45,000 | 426 | 30.6 | x | " | " | " | " |
| 1-19 | 300 | 45,000 | 77  | 88.4 | o | " | " | 2.0 | 0.4 |
| 1-20 | 450 | 45,000 | 98  | 89.5 | o | " | " | " | " |
| 1-21 | 300 | 60,000 | 103 | 58.0 | x | " | " | " | " |
| 1-22 | 450 | 60,000 | 130 | 61.9 | x | " | " | " | " |
| 1-23 | 300 | 60,000 | 78  | 58.4 | x | " | " | 1.6 | " |
| 1-24 | 450 | 60,000 | 99  | 50.0 | x | " | " | 6 | 1 |
| 1-25 | 300 | 10,000 | 43  | 94.8 | o | " | 3,000~5,000 | " | " |
| 1-26 | 300 | 10,000 | 43  | 97.7 | o | " | 10,000~12,000 | " | " |

*AV: amount (m³/hr) of gas per 1 m² of the surface area of catalyst

Figure 1:
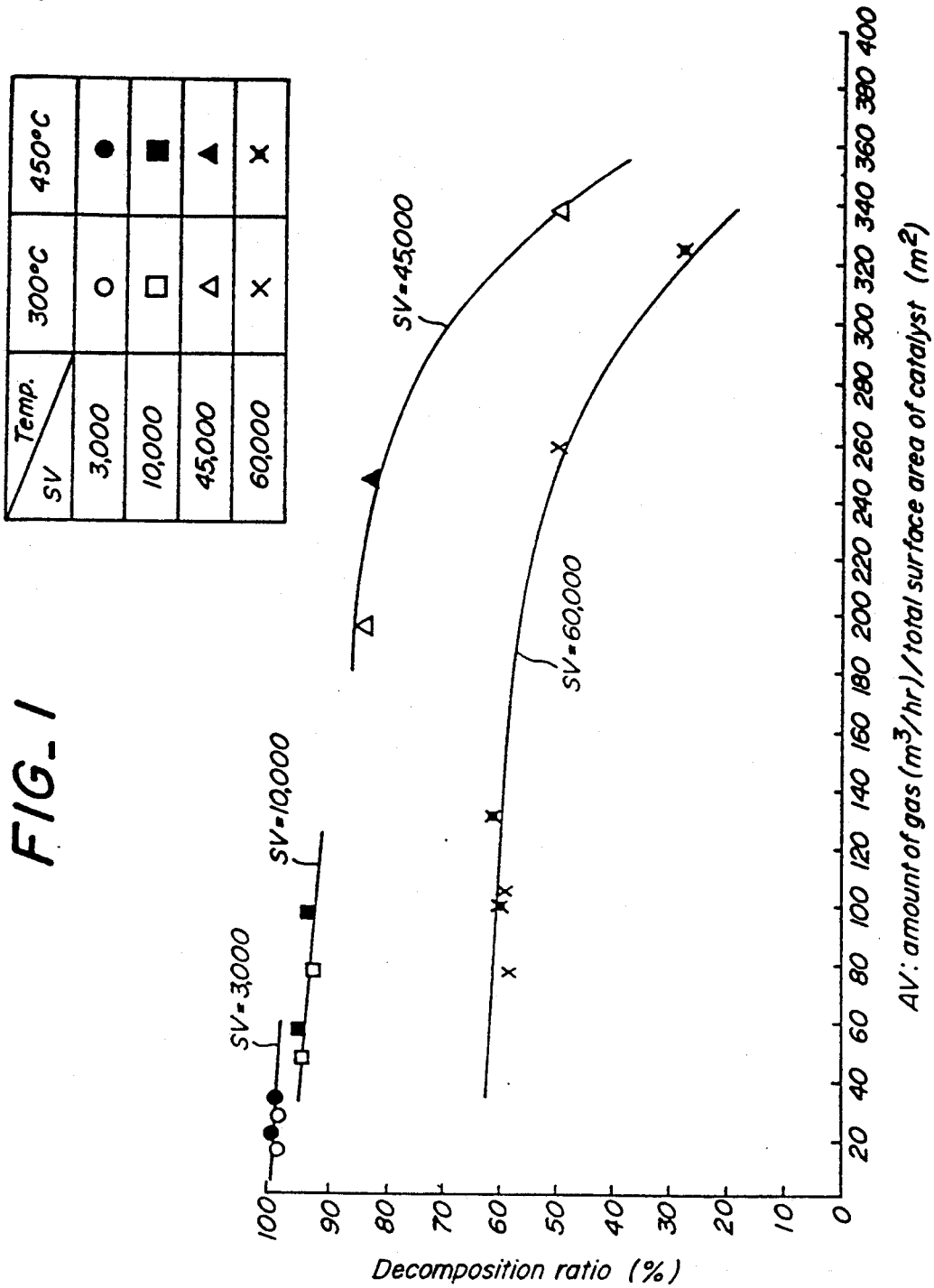
FIG. 1 is a graph illustrating a relation between the AV (the ratio of the amount ($m^3/hr$) of gas to the total surface area ($m^2$) of catalyst) and the decomposition ratio of polychlorinated dibenzo-p-dioxins (hereinafter, abbreviated as PCDDs)

A relation between the AV and the decomposition ratio in percentage of the ga at a temperature of 300° C. is illustrated in FIG. 1.

As illustrated in Table 1 and FIG. 1, it was able to be ascertained that a good decomposition ratio in percentage was able to be obtained by setting the treating temperature to at least 250° C., the SV to not higher than 50,000 hr$^{-1}$ and the AV to not larger than 250 m³/hr.

EXAMPLE 2

A decomposition test of a gas containing PCDD was effected under the condition described below by the use of a completed catalyst produced by depositing 1.5 g of Pt (per 1l of catalyst) on a honeycomb shaped article consisting of a composite oxide of Ti and Zr in a molar ratio of $TiO_2:ZrO_2=7:3$ and having an equivalent diameter of a through-hole of 2 mm and a wall thickness of 0.4 mm. The obtained results are shown in the following Table 2.

| Condition: | |
|---|---|
| Composition of gas | PCDD 100 ng/nM³ air remainder |
| Space velocity (SV) | 20,000 hr$^{-1}$ |
| Temperature | 350° C., 400° C. and 450° C. |

TABLE 2

| Experiment No. | Temperature (°C.) | Decomposition ratio (%) |
|---|---|---|
| 2-1 | 350 | 93 |
| 2-2 | 400 | 95 |
| 2-3 | 450 | 97 |

EXAMPLE 3

The same test as described in Example 2 was effected by the use of a honeycomb shaped article consisting of a composition of Ti, Si and Zr in a molar ratio of $TiO_2:SiO_2:ZrO_2=7:1.5:1.5$ and having an equivalent diameter of a through-hole of 2.0 mm and a wall thickness of 0.4 mm. The obtained results are shown in the following Table 3.

TABLE 3

| Experiment No. | Temperature (°C.) | Decomposition ratio (%) |
|---|---|---|
| 3-1 | 350 | 93 |
| 3-2 | 400 | 95 |
| 3-3 | 450 | 97 |

EXAMPLE 4

A completed catalyst produced by depositing 2.0 g of Pt (per 1 l of catalyst) on a honeycomb shaped article, which consisted of a composite oxide of Ti and Si in a molar ratio of $TiO_2:SiO_2 = 8.5:1.5$ and had an equivalent diameter of a through-hole of 2.0 mm and a wall thickness of 0.5 mm, was arranged in a portion from an incinerator to a cooling duct (at a position before the exhaust gas flows into an electric dust collector) in an incineration plant for city refuse, and the concentration of PCDDs in the exhaust gas in the outlet side of the electric dust collector was measured (present invention). For comparison, the above described completed catalyst was not arranged and the concentration of PCDDs in the exhaust gas in the outlet side of the electric dust collector was measured (Comparative sample). The obtained results are shown in the following Table 4.

| Condition: | |
|---|---|
| Space velocity (SV) | $10,000 \, hr^{-1}$ |
| Temperature | 400° C. |

TABLE 4

| Experiment No. | Concentration of PCDDs in the exhaust gas in the outlet side of the electric dust collector (ng/Nm³) | |
|---|---|---|
| | Present invention | Comparative sample |
| 4-1 | 23 | 464 |
| 4-2 | 9 | 290 |
| 4-3 | 13 | 120 |

EXAMPLE 5

Figure 3:
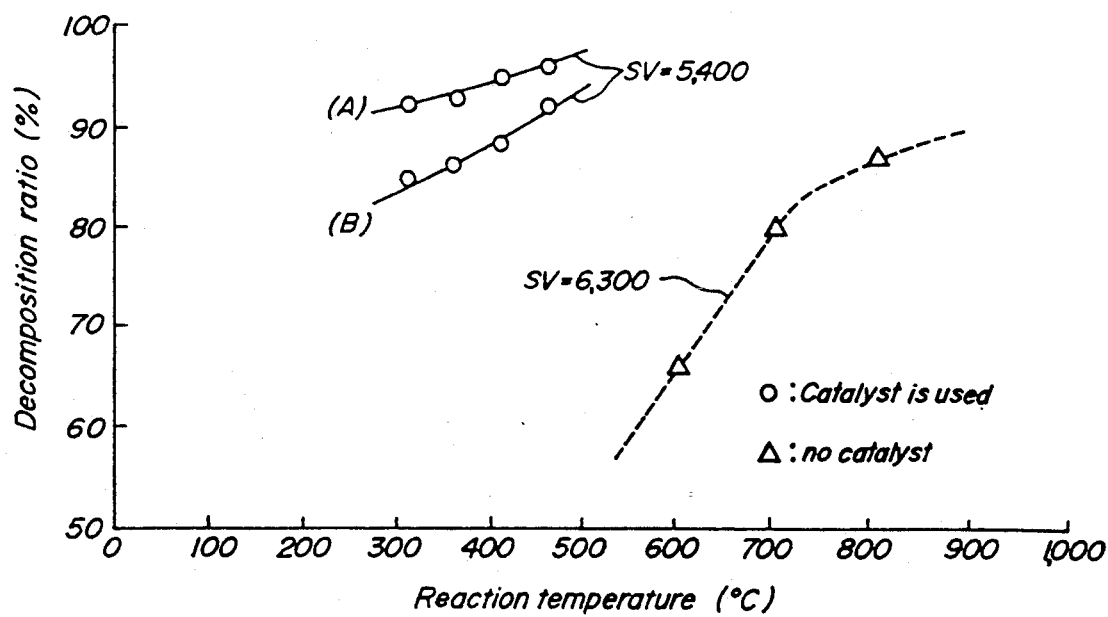
FIG. 3 is a graph illustrating relations between the reaction temperature of PCDDs and the decomposition ratio thereof.

There was used a completed catalyst produced by depositing 1.5 g of Pt (per 1 l of catalyst) on a honeycomb shaped article consisting of a composite oxide of Ti and Si in a molar ratio of $TiO_2:SiO_2=8.5:1.5$ and having an equivalent diameter of a through-hole of 6 mm and a wall thickness of 1 mm, and a decomposition test of a gas containing PCDDs was effected at a variant temperature under a condition of $SV=5,400 \, hr^{-1}$ and $AV=23-29 \, m^3/hr$. The obtained results are shown in FIG. 3. In FIG. 3, the straight line (A) illustrates the decomposition ratio of the gas having a concentration of PCDDs of 10,000–12,000 ng/Nm³ at the inlet of a reactor, and the straight line (B) illustrates the decomposition ratio of the gas having a concentration of PCDDs of 1,100–1,400 ng/Nm³ at the inlet of the reactor. For a comparative sample, a honeycomb shaped article having the same dimension as described above and having no catalyst deposited thereon was used, and a decomposition test of the gas was effected under a condition of $SV=6,300 \, hr^{-1}$ and $AV=27 \, 34 \, m^3/hr$. The obtained results are also shown in FIG. 3.

EXAMPLE 6

A decomposition test of a gas containing PCDD was effected under a variant treating condition by the use of each of a catalyst-deposited honeycomb shaped article (honeycomb L) same as that used in Example 5 and a honeycomb shaped article (honeycomb S) made of the same composite oxide as that constituting the catalyst-deposited honeycomb shaped article of Example 5 and having an equivalent diameter of a through-hole of 2.4 mm and a wall thickness of 0.4 mm. The obtained results are shown in FIG. 4.

It can be seen from FIG. 4 that, in honeycomb L, the remaining ratio of PCDDs increases corresponding to the increase of SV, but in honeycomb S, the remaining ratio of PCDD decreases corresponding to the increase of SV.

EXAMPLE 7

Figure 6:
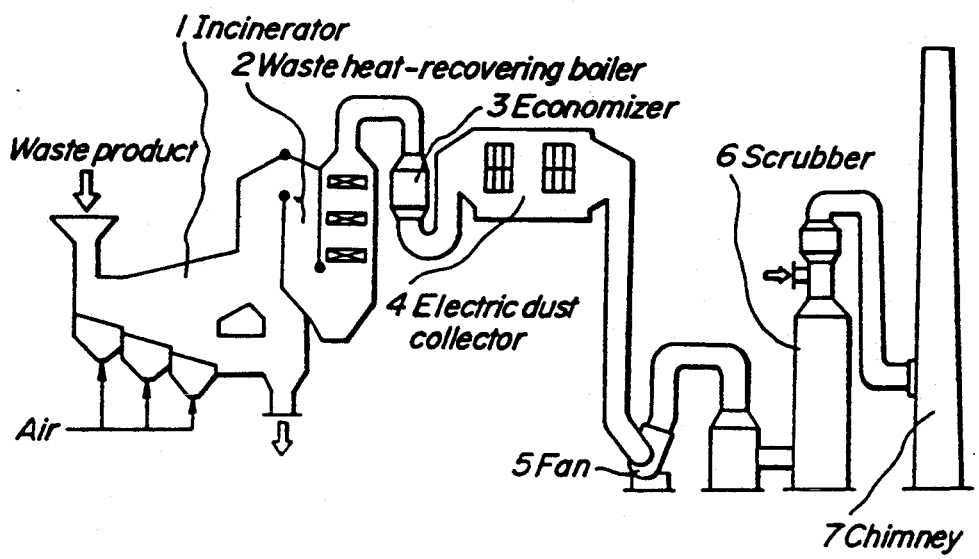
FIG. 6 is an explanative view of an incineration plant.

There were arranged 3 reactors (referred to FIG. 5), each containing therein catalyst-deposited shaped articles described in Example 5, so as to be connected with each other in a series relation along the flow direction of gas in the exhaust gas duct between the incinerator 1 and the cooler 3 in an incineration plant illustrated in FIG. 6. The variation of concentration of each component of PCDDs at the outlet of each reactor is illustrated in FIG. 7.

Further, the variation of decomposition ratio of each component of PCDDs in each reactor is illustrated in FIG. 8.

EXAMPLE 8

An exhaust gas was sucked through an exhaust gas duct arranged between the incinerator 1 and the cooler 3 of an incineration plant illustrated in FIG. 6, and the equivalent diameter of a through-hole and the aperture ratio of a honeycomb structural body were varied, and the variation of pressure loss with the lapse of time was examined under a condition of $SV=10,000 \, hr^{-1}$ and a temperature of 300° C. The obtained results are shown in Table 5.

It can be seen from Table 5 that, when the equivalent diameter of a through-hole is at least 2.0 mm and the aperture ratio is at least 50%, clogging of the catalyst and rapid increase of pressure loss due to the dust contained in the exhaust gas can be prevented.

TABLE 5

| Experiment No. | Equivalent diameter of through-hole (mm) | Aperture ratio (%) | Pressure loss (mmH₂O) | | |
|---|---|---|---|---|---|
| | | | After 1 hour | After 500 hours | After 1,000 hours |
| 8-1 | 1.6 | 64 | 29 | not less than 1,000 | clogged |
| 8-2 | 2.0 | 48 | 54 | 493 | clogged |
| 8-3 | 2.0 | 69 | 26 | 48 | 56 |
| 8-4 | 6.0 | 45 | 58 | 224 | 384 |
| 8-5 | 6.0 | 56 | 43 | 49 | 74 |
| 8-6 | 6.0 | 73 | 23 | 31 | 48 |
| 8-7 | 10.0 | 44 | 63 | 146 | 290 |
| 8-8 | 10.0 | 51 | 45 | 56 | 83 |
| 8-9 | 10.0 | 69 | 38 | 39 | 41 |
| 8-10 | 30 | 44 | 70 | 104 | 210 |
| 8-11 | 30 | 56 | 58 | 63 | 68 |
| 8-12 | 30 | 78 | 44 | 46 | 59 |
| 8-13 | 50 | 59 | 67 | 72 | 81 |
| 8-14 | 50 | 69 | 63 | 69 | 76 |

As described above, according to the present invention, poisonous organic chlorine compounds, such as dioxin and the like, or poisonous organic chlorine compound-forming substances contained in an exhaust gas exhausted from an incinerator can be effectively decomposed, and can prevent the formation of the poisonous organic chlorine compounds in the dust collector. Therefore, the discharging of poisonous organic chlorine compound from an incineration plant can be effectively prevented.

Moreover, according to the present invention, poisonous organic chlorine compounds can be removed at low temperature, and further an exhaust gas can be cooled when the exhaust gas flows from the incinerator to the dust collector, and hence the running cost, cooling cost and installation cost can be reduced.

What is claimed is:

1. A method for removing chlorinated dibenzo dioxins and chlorinated dibenzo furans from industrial or municipal waste incinerator exhaust gases, comprising:

placing a catalyst composition in honeycomb form in the exhaust stream of such an incinerator, said honeycomb having an open frontal area of at least 50% and a said catalyst composition consisting essentially of components A and B, wherein said component A is selected from the group consisting of a single-component oxide of a metal selected from the group consisting of Ti, Si and Zr, and a multi-component composite oxide of metals selected from the group consisting of Ti, Si and Zr, and said component B is a metal or metal oxide selected from the group consisting of Pt, Pd, and Ru and oxides thereof; and passing industrial or municipal incinerator waste exhaust gases in contact with said catalyst composition at a reaction temperature of not lower than 250° C., a space velocity of the exhaust gases of not higher than 50,000 hr$^{-1}$ and an amount of the exhaust gases of not larger than 250 m$^3$/hr 1 m$^2$ of geometric surface area of the catalyst honeycomb.

2. The method of claim 1, wherein the catalyst is a honeycomb catalyst consisting of a honeycomb structural body having through-holes, each of which has an equivalent diameter of at least 2 mm, and having an aperture ratio of at least 50%.

3. The method of claim 1, wherein the reaction temperature ranges from 250°–500° C., and the space velocity of the exhaust gases ranges from 2,000–50,000 hr$^{-1}$.

4. The method of claim 1, wherein the chlorinated dibenzo dioxins and chlorinated dibenzo furans are at least about 85% decomposed.

5. The method of claim 1, wherein component A of the catalyst composition consists of binary and/or ternary multi-component composite oxides.

6. The method of claim 1, wherein the industrial or municipal waste exhaust gases include at least one other pollutant selected from the group consisting of NO$_x$, SO$_x$, HCl, CO, and cyanogen or halogen gas.

7. The method of claim 1, wherein the catalyst composition has a specific surface area in the range of 10–450 m$^2$/g.

8. The method of claim 1, wherein the exhaust gases are passed through a dust collector before being passed in contact with the catalyst composition.

9. The method of claim 1, wherein the amount of the exhaust gases per 1 m$^2$ of surface area of geometric the catalyst is not larger than 100 m$^3$/hr at the treating temperature.

10. The method of claim 1, wherein catalyst component A consists essentially of a binary or ternary oxide selected from the group consisting of TiO$_2$—SiO$_2$, TiO$_2$-ZrO$_2$, and TiO$_2$—SiO$_2$—ZrO$_2$.

11. The method of claim 10, wherein the catalyst component A is TiO$_2$—ZrO$_2$ wherein TiO$_2$ comprises 5-14 95 mol% and ZrO$_2$ comprises 95–5 mol% of said component A.

12. The method of claim 10, wherein catalyst component A is selected from the group consisting of TiO$_2$—SiO$_2$ and TiO$_2$—SiO$_2$—ZrO$_2$.

13. The method of claim 12, wherein TiO$_2$ comprises at least about 70 mol% and SiO$_2$ and/or ZrO$_2$ comprises not more than about 30 mol% of said component A.

14. The method of claim 12, wherein the catalyst component A is TiO$_2$—SiO$_2$—ZrO$_2$ wherein TiO$_2$ comprises 5–95 mol% and SiO$_2$ and/or ZrO$_2$ comprises 95–5 mol% of said component A.

15. The method of claim 14, wherein ZrO$_2$ comprises up to 30% by weight of the TiO$_2$—SiO$_2$—ZrO$_2$ component A.

16. The method of claim 1, wherein said honeycomb has an open frontal area of at least 90%.

* * * * *